United States Patent Office 3,294,830
Patented Dec. 27, 1966

3,294,830
ADDITION AND TELOMERIZATION REACTIONS OF OLEFINS WITH ORGANOMERCURY COMPOUNDS
David Horvitz and William D. Baugh, Cincinnati, and Robert J. Shaw, Monroe, Ohio, assignors to National Distillers and Chemical Corporation, New York, N.Y., a corporation of Virginia
No Drawing. Filed Dec. 10, 1963, Ser. No. 329,358
9 Claims. (Cl. 260—431)

This invention relates to new organomercury compounds and to their method of preparation.

Organomercury compounds have shown marked utility and importance in many fields. For example, they have been employed as fungicides, herbicides, antiseptics, and in related pharmacological and physiological uses. Consequently, it is of considerable importance to discover new and useful organomercury compounds and to have a new process for the production of organomercury compounds.

It is, therefore, an object of this invention to provide new and useful organomercury compounds.

It is another object of this invention to provide a novel method for preparing the new and useful organomercury compounds.

It is still another object of this invention to provide new and valuable compounds that can be used in a variety of pharmacological and physiological applications.

Additional objects will be apparent from the following detailed description.

In accordance with this invention it has been found that new organomercury compounds can be prepared by reacting olefins with organomercury compounds or with mercury salts of oxyacids in such a way that the olefin is inserted between the organic radical and the mercury atom or between the oxyacid anion and the mercury atom. It is possible for the olefin either to enter as a single molecule per molecule of mercury compound or to enter in polymerized form. The reactions are illustrated by the following equations:

(1) $R'R''C=CR'''R''''+R_AHgZ \rightarrow$
$R_A(R'R''C—CR'''R'''')_nHgZ$ (2) $R'R''C=CR'''R''''+HgY_2 \rightarrow$
$Y(R'R''C—CR'''R'''')_nHgY$ (3) $R'R''C=CR'''R''''+R_AHgR_B \rightarrow$
$R_A(R'R''C—CR'''R'''')_nHg(R'R''C—CR'''R'''')_mR_B$ wherein $R_A$ and $R_B$ are organic radicals e.g., alkyl, aryl, alicyclic, or heterocyclic, with the carbon atom linked to mercury or they are carboxylic ester groups of the form $$\text{RO}\overset{\text{O}}{\underset{\|}{\text{C}}}—$$

wherein R is an organic radical selected from the group consisting of alkyl and aryl radicals with the carbonyl carbon atom linked to the mercury atom; $R_A$ and $R_B$ can be the same or different radicals. $R'$, $R''$, $R'''$ and $R''''$ can be hydrogen; halogen, i.e., fluorine, chlorine, bromine, iodine, or fluorine; or organic radicals, e.g., alkyl, aryl, acyloxy, alkoxy, aryloxy, nitrile, carboxylic acid or ester. Z can be any anion, such as acetate, propionate, chloride, nitrate, sulfate, etc. Y is any organic acid anion, such as acetate, propionate, benzoate, and the like. The letters $n$ and $m$ are integers equal to one or more. It is also possible to use mixtures of olefins in order to obtain copolymeric products.

The conditions under which the reactions take place and the nature of the resulting products indicate that the process is probably telomerization, initiated by free radicals and sustained by a free radical chain reaction. The reaction can be conducted simply by heating the mercury compound in the presence of the olefin, without the addition of any other agent, or, preferably, in the presence of a free radical initiator, such as a peroxide, an azo compound, a redox reaction which generates free radicals, or ultraviolet radiation.

Examples of mercury compounds that may be employed for the reaction with olefins include phenylmercuric chloride;

$ClCH=CHHgCl$; $HOCH_2CH_2HgOOC \cdot CH_3$
$CH_3OCH_2CH_2HgOOC \cdot CH_3$
$CH_3COOCH_2CH_2HgOOC \cdot CH_3$ $C_2H_5HgCl$; m-chloromercuribenzoic acid, methyl ester; $NC \cdot CH_2HgOOC \cdot CH_3$; $(C_2H_5)_2Hg$; cyclohexylmercuric acetate; 2-chloromercurithiophene; 3-chloromercuripyridine;

$$CH_3COOHgCH_2\underset{\underset{HO}{|}}{C}H—\underset{\underset{OH}{|}}{C}HCH_2HgOOC \cdot CH_3; \quad CH_3\underset{\underset{OH}{|}}{C}HCH_2HgNO_3$$

chloromercuribenzenesulfonic acid; and the like.

Suitable olefins for the preparation of telomers include ethylene, propylene, styrene, acrylonitrile, allyl chloride, vinyl acetate, tetrafluorethylene, and the like, and mixtures thereof.

Because of lesser reactivity or for steric reasons, some olefins, e.g., butene-2, cyclohexane, and other non-terminal olefins, can insert only a single molecule. While it is known that an olefin, such as butene-2, can react with a mercuric salt in the presence of certain compounds having active hydrogen, such as water, to form an adduct, as in the equation $$H_2O + CH_3CH=CHCH_3 + HgX_2 \longrightarrow HO\underset{\underset{H_3C}{|}}{C}H\underset{\underset{CH_3}{|}}{C}HHgX + HX$$

the insertion of such an olefin between the carbon and the mercury atoms of an organomercury compound is novel and a feature of this invention, as in the following equation:

$$CH_3\overset{O}{\underset{\|}{C}}OCH_2CH_2HgOOC \cdot CH_3 + CH_3CH=CHCH_3 \longrightarrow$$
$$CH_3\overset{O}{\underset{\|}{C}}OCH_2CH_2\underset{\underset{CH_3}{|}}{C}H—\underset{\underset{CH_3}{|}}{C}H—HgOOC \cdot CH$$

The following types of reactions and products are within the scope of the present invention:

(1) $R_AHgZ + nM \rightarrow R_AM_nHgZ$, wherein $R_A$ is an organic radical with a carbon atom joined to a mercury atom, M is an olefin, $n$ is 1 or higher, and Z is an anion.

(2) $HgY_2 + xM \rightarrow YM_xHgY$, where Y is an organic acid anion, M is an olefin, and $x$ is 2 or higher.

(3) $R_A\overset{\|}{\underset{O}{C}}HgZ + nM \longrightarrow R_A\overset{\|}{\underset{O}{C}}M_nHgZ$ where $R_A$ is an alkoxy, aryloxy, or secondary amino group; M is an olefin; $n$ is at least 1; and Z is an anion.

(4) $R_AR_BHg + (m+n)M \rightarrow R_AM_mHgM_nR_B$, where $R_A$ and $R_B$ are the same or different organic radicals with carbon atoms joined to mercury atoms, M is an olefin, and $m$ and $n$ are at least 1.

In each of the above, M can be a single olefin or a mixture of olefins. The relative amounts of the different olefins in the final product depend upon their relative reactivities and upon the relative concentrations and/or pressures at which they were present during the reaction.

The reaction is carried out at a temperature within the range of about 50° to 200° C., depending upon the mercury compound involved. For example, when an organomercuric acetate is used, the preferred range is from about 80° C. to 130° C.; with an aliphatic mercuric chloride, the preferred temperature is between about 50° and 100°

C.; with an aryl mercuric chloride the preferred range is from about 120° to 175° C. Compounds that decompose thermally at low temperatures should be reacted at lower temperatures, and more stable compounds may be reacted at higher temperatures.

The concentration of olefin is important in determining the molecular weight of the final products, higher concentrations leading to higher molecular weights. In the case of volatile olefins the concentration is controlled by the pressure employed. When ethylene or propylene is the selected olefin, the partial pressure of the olefin should be at least one atmosphere.

If a free radical initiator is employed, it should be one whose decomposition temperature is within the range at which the telomerization is to be carried out and whose half-life is appreciable in that temperature range. Examples of suitable free radical initiators include benzoyl peroxide, t-butyl perbenzoate, di-t-butyl peroxide, cumene peroxide, ammonium persulfate, hydrogen peroxide, $\alpha,\alpha'$-azo-bis-isobutyronitrile, and the like, and mixtures thereof. The free radical initiator may be introduced into the reaction all at once, or it may be fed in continuously during the course of the reaction.

Since the reaction can be initiated thermally, there is no lower limit to the quantity of free radical initiator employed, but preferably the amount used is the range of about 0.1 to about 10 mole percent of the amount of mercury compound. In general when the reaction is carried out in the presence of a free radical initiator better yields are obtained than when a straight thermal reaction is employed. Up to a point, increasing the amount of the initiator results in increased yield of product. Yield of the product is also increased considerably by the continuous slow addition of the initiator during the course of the reaction.

The reaction can be carried out with or without a solvent. If it is desired to use a solvent in order to solubilize a compound of high melting point, to keep the product in solution to achieve higher molecular weights, to dissipate the heat of reaction, or for any other reason, the selected solvent should be unreactive, and therefore, not one that is sensitive to free radical reactions; for example, olefinic solvents or halocarbon compounds should not be used if it is not desired to have them participate in the reaction. Suitable solvents include alkanes, cycloalkanes, aromatic hydrocarbons, ethers, and other solvents and combinations thereof that are resistant to free radical attack. Specific suitable solvents include dioxane, benzene, cyclohexane, methanol octane, and the like, and mixtures thereof.

It is also a feature of this invention that the products obtained in the above-described reactions may be reacted further with an olefin, either the same olefin or one different from that used in the basic reaction, continue growth of the chain attached to the mercury.

The mercury compounds resulting from these reactions may be used as fungicides, herbicides, antiseptics, diuretics, and the like. They also may be used as intermediates for the manufacture of valuable organic compounds, especially long-chain carbon compounds with functional groups at one or both ends of the chain, that are not readily attainable otherwise. For example, if phenylmercuric chloride is treated with ethylene by the process of this invention, a product is obtained that has a phenyl group attached to one end of an essentially linear chain of carbon atoms and a chloromercuri- group at the other end. If this product is hydrolyzed with strong acid, the chloromercuri- group is removed and a compound is obtained that is a monoalkane derivative of benzene. The chain length can be varied by varying the conditions employed in the telomerization reaction.

If mercuric acetate is telomerized with ethylene, there is obtained a linear polyethylene chain with an acetoxy group at one end and an acetoxymercuri- group at the other end. Treatment of this compound with iodine replaces the acetoxymercuri- group with iodine. Subsequent hydrolysis with caustic produces a linear polyethylene chain terminated at each end by a hydroxyl group.

The mercury-containing group can also be replaced by hydroxyl by heating the telomer with aluminum powder in the absence of air and moisture. The mercury-containing group is replaced by aluminum; further treatment with oxygen and subsequent hydrolysis result in a compound having a hydroxyl group in place of the original mercury.

It is also possible to replace the mercury with amino, carboxylic acid, aldehyde, etc., groups.

The following examples illustrate methods of carrying out the present invention; it is to be understood that these examples are given for the purpose of illustration, not of limitation. Unless otherwise specified, all parts are given by weight.

*Example I*

Methoxyethylmercuric acetate (7.975 grams, 0.025 mole), prepared by the reaction of ethylene with mercuric acetate in methanol, was placed in a pressure vessel with 50 ml. of dioxane and pressurized to 745 p.s.i with ethylene. The temperature was adjusted to about 120° C. and maintained there for 2 hours. The liquid reaction mixture was then diluted with additional dioxane and chloroform to dissolve the precipitate that had formed. The solution was extracted with water to remove unreacted methoxyethylmercuric acetate. The organic layer was evaporated to leave a white wax that melted at 64°–65° C. Infrared analysis showed the presence of an aliphatic ether group, a saturated chain containing more than three methylene groups in a row, no branching, and the presence of a carboxylate group, indicating a telomer having the structure $CH_3O(CH_2CH_2)_nHgOOC \cdot CH_3$. Ebulliometric determination showed that the product had a molecular weight of 694, indicating that an average of about 13.4 ethylene molecules had been inserted between the carbon and the mercury atoms of the starting organomercury compound.

When a chloroform solution of the wax was shaken with and aqueous hydrochloric acid solution, the acetate anion was replaced by chlorine and the resulting wax had a melting point of 83°–84° C.

*Example II*

Benzoyl peroxide (0.060 gram) was added to a solution of methoxycarbonylmercuric acetate (7.975 grams, 0.025 mole) (previously prepared by reaction of carbon monoxide with mercuric acetate in methanol) in 50 ml. of dioxane in a pressure vessel. The pressure was brought to 735 p.s.i. with ethylene, and the temperature was brought to 140° C. where it was maintained for about 3 hours. The reaction product was treated with hydrochloric acid to decompose unreacted methoxycarbonylmercuric acetate. On addition of water a wax precipitated out; infrared analysis showed that it had more than three methylene groups in a row and contained an aliphatic ester group. It had the structure

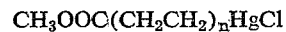

$$CH_3OOC(CH_2CH_2)_nHgCl$$

since reaction with hydrochloric acid had caused replacement of the acetate anion by chlorine.

*Example III*

Benzoyl peroxide (0.12 gram) was added to a mixture of methoxyethylmercuric acetate (15.95 grams, 0.050 mole) in 100 ml. of cyclohexane in a pressure vessel. The reaction vessel was pressurized to 825 p.s.i. with ethylene and then heated at about 125° C. for about 3 hours. About 14 grams of wax were obtained after separation of unreacted methoxyethylmercuric acetate by extraction with water. A small part of this wax was less soluble in benzene than the bulk of the product and was found to melt at 94°–96° C.; infrared analysis showed the presence of a chain of carbon atoms, an aliphatic ether, and a carboxylate group. About 80 percent of the wax had a melting point of 60°-62° C.; infrared analysis showed both ether and carboxylate groups as well as a chain of carbon atoms. The ether band was stronger in the latter material, indicating a lower molecular weight. An elementary analysis plus a chemical analysis for methoxy group were performed on the lower melting wax with the following results:

TABLE

|   | Percent | Average |
|---|---|---|
| C | 54.91 / 54.75 | 54.83 |
| H | 8.77 / 8.95 | 8.86 |
| CH₃O | 3.65 / 3.82 | 3.74 |
| Hg | 28.14 | 28.14 |

Based on the assumption that there is one acetate anion for each mercury atom, the average empirical composition of the wax was calcuated to be

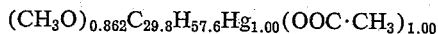

$(CH_3O)_{0.862}C_{29.8}H_{57.6}Hg_{1.00}(OOC \cdot CH_3)_{1.00}$

Example IV

Methoxycarbonylmercuric acetate (7.95 grams, 0.025 mole) was heated in a pressure vessel with 70 ml. of cyclohexane, 0.5 ml. of t-butyl perbenzoate, and propylene gas. The temperature was maintained at 120° C. for 3 hours. From the reaction products there was isolated a waxy solid that was shown by infrared analysis to contain an ester group and more than three methylene groups in a row.

Example V

Hydroxyethylmercuric acetate (14 grams, 0.046 mole) in 100 ml. of cyclohexane was put into a pressure vessel with 0.5 ml. of t-butyl perbenzoate and heated at 120° C. for 4 hours under a pressure of 650 p.s.i. of ethylene. A very low melting wax (10.1 grams) was isolated and shown by infrared analysis to contain a hydroxy group, more than three methylene groups in a row, and a carboxylate group.

Example VI

The procedure of Example V was repeated except that acetoxyethylmercuric acetate (17.5 grams, 0.050 mole) was used instead of hydroxyethylmercuric acetate. The resulting wax (21.7 grams) was shown by infrared analysis to contain an ester group, more than 3 methylene groups in a row, and a carboxylate group.

Examination by nuclear magnetic resonance showed the presence of two slightly shifted acetoxy groups; the ratio of the acetoxy groups was 1:1. The acetoxy group joined to the carbon atom of the chain was shifted slightly from the acetoxy group that is an anion joined to the mercury atom.

Example VII

The procedure of Example VI was repeated except that benzene was used instead of cyclohexane. The wax isolated from the reaction was shown by infrared analysis to contain an ester group, more than three methylene groups in a row, and a carboxylate group.

Example VIII

Mercuric acetate (15.9 grams, 0.050 mole) and 0.5 ml. of t-butyl perbenzoate were added to 100 ml. of cyclohexane in a pressure vessel. The reactor was pressurized to 650 p.s.i. with ethylene and heated at 120° C. for 5 hours. The low melting wax (36° C.) (13.0 grams) isolated from this reaction was shown by infrared analysis to contain an ester group, a carboxylate group, and more than three methylene groups in a row. It contained 27.85 percent of mercury, as determined by chemical analysis.

Example IX

A wax (2.17 grams) produced by the reaction of acetoxyethylmercuric acetate and ethylene in the presence of a peroxide was placed in a pressure vessel with 100 ml. of cyclohexane and 0.5 ml. of t-butyl perbenzoate. The vessel was pressurized to 800 p.s.i. with ethylene and heated at 120° C. for 12 hours. There were obtained 27.3 grams of a wax that was shown by infrared analysis to have an ester group, a carboxylate group, and more than three methylene groups in a row.

Example X

Methoxyethylmercuric chloride was prepared by the reaction of ethylene with an equimolar mixture of mercuric chloride and mercuric oxide in methanol at atmospheric pressure and ambient temperature. A portion (11.0 grams, 0.037 mole) of the isolated product was mixed with 75 mls. of cyclohexane and benzoyl peroxide (0.090 gram) and heated in an autoclave at 100° C. for 5 hours under ethylene gas at 800 p.s.i. From the reaction product was isolated 11.7 grams of a wax which was shown by chemical analysis to contain 26.1% of mercury. Infrared analysis showed the presence of an ether group and a chain of more than three methylene groups in a row. The wax had a melting point of 85° C.

Example XI

Phenyl mercuric chloride (9.3 grams, 0.03 mole) was added to 100 mls. of benzene together with 0.2 ml. of t-butyl perbenzoate and the mixture was heated under an ethylene pressure of 700 p.s.i. for 5 hours at about 120° C. A hard wax (11.2 grams) was obtained from the reaction product.

Example XII

Acetoxyethylmercuric acetate (11.0 grams, 0.029 mole) was dissolved in 200 mls. of methanol, and 0.5 ml. of t-butyl perbenzoate was added. The mixture was heated in an autoclave under 750 p.s.i. ethylene for 5 hours at 120° C. The product melted at 85°–90° C. and was found by chemical analysis to contain 26% of mercury. Infrared analysis showed the presence of an ether group, a chain of more than three methylene groups in a row, and a carboxylate group. Evidently, in the methanol solution, the acetoxy group attached to carbon must have been displaced by methoxy.

Example XIII

Acetoxyethylmercuric acetate (17.5 grams, 0.05 mole) was added to 75 mls. of octene-1 which contained 0.5 ml. of t-butylperbenzoate. The mixture was refluxed at 120° C. for 5 hours under an atmosphere of nitrogen. A small amount of mercury metal (0.8 gram) had formed and was filtered off. The solution was washed with water to remove unreacted acetoxyethylmercuric acetate and was then dried and distilled to remove the octene. An 8 ml. liquid residue was left which had a specific gravity of 1.26 gms./cc. and which on analysis was found to contain 30.9% of mercury. Infrared analysis showed the presence of an ester group and a carboxylate group.

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. A process for preparing organomercury compounds which comprises reacting, as the sole reactants, at least one olefin with a mercury compound containing at least one carbon-mercury bond and selected from the group of $R_AHgZ$ and $R_AHgR_B$ wherein $R_A$ and $R_B$ are organic radicals selected from the group consising of alkyl, alkenyl, aryl, β-hydroxyalkyl, β-alkoxyalkyl, β-acyloxyalkyl, cyanoalkyl, alicyclic, and heterocylic radicals having a carbon atom linked to the mercury atom and carboxylic ester groups of the form $$RO\overset{O}{\underset{\|}{C}}-$$

wherein R is an organic radical selected from the group consisting of alkyl and aryl radicals having the carbonyl carbon atom linked to the mercury atom and Z is an anion derived from an acid selected from the group consisting of mineral acids and organic acids, whereby at least one molecule of the olefin is inserted between the carbon atom and the mercury atom of the carbon-mercury linkage in the mercury compound.

2. A process for preparing organomercury compounds which comprises reacting, as the sole reactants, at least one olefin with a mercury compound containing at least one carbon-mercury bond and selected from the group of $R_AHgZ$ and $R_AHgR_B$ wherein $R_A$ and $R_B$ are organic radicals selected from the group consisting of alkyl, alkenyl, aryl, β-hydroxyalkyl, β-alkoxyalkyl, β-acyloxyalkyl, cyanoalkyl, alicyclic, and heterocyclic radicals with a carbon atom linked to the mercury atom and carboxylic ester groups of the form $$RO\overset{O}{\underset{\|}{C}}-$$

wherein R is an organic radical selected from the group consisitng of alkyl and aryl radicals having the carbonyl carbon atom linked to the mercury atom and Z is an anion derived from an acid selected from the group consisting of mineral acids and organic acids whereby at least one molecule of the olefin is inserted between the carbon atom and the mercury atom of the carbon-mercury linkage in the mercury compound at a temperature within the range of about 50° and 200° C. and in the presence of a free radical initiator.

3. As a new composition of matter, mercury-containing organic compounds having the general formula selected from the group consisting of $R_AM_mHgZ$ and $$R_AM_mHgM_nR_B$$

wherein $R_A$ and $R_B$ are organic radicals selected from the group consisting of alkenyl, aryl, β-hydroxyalkyl, β-alkoxyalkyl, β-acyloxyalkyl, cyanoalkyl, alicyclic, and carboxylic ester radicals of the form $$RO\overset{O}{\underset{=}{C}}-$$

wherein R is an organic radical selected from the group consisting of alkyl and aryl radicals; M is the radical —R′R″C—CR‴R″″ wherein R′, R″, R‴, and R″″ are radicals selected from the group consisting of hydrogen, chlorine, bromine, iodine, fluorine, alkyl, aryl, alkoxy, acyloxy, nitrile, carboxylic acid, and carboxylic ester radicals; Z is an anion derived from an acid selected from the group consisting of mineral acids and organic acids; and $m$ and $n$ are integers of at least one each when $R_A$ and $R_B$ are alkenyl, cyanoalkyl, alicyclic, and carboxylic ester radicals and at least two each when $R_A$ and $R_B$ are aryl, β-hydroxyalkyl, β-alkoxyalkyl, and β-acyloxyalkyl radicals.

4. The process of claim 1 wherein the reaction takes place at a temperature within the range of about 50° to 200° C.

5. The process of claim 1 wherein the reaction takes place in the presence of a free radical initiator.

6. A process of claim 2 wherein the olefin is ethylene.

7. The process of claim 2 wherein the olefin is propylene.

8. The composition of claim 3 wherein the olefin is ethylene.

9. The composition of claim 3 wherein the olefin is propylene.

References Cited by the Examiner

UNITED STATES PATENTS 3,020,293    2/1962    Schonberg et al. _____ 260—431

FOREIGN PATENTS 835,771    5/1960    Great Britain.

OTHER REFERENCES

Chatt, Chemical Reviews, vol. 48 (1951), pages 7 to 43 (pages 9, 10, 34, 35, and 36 principally relied on).

TOBIAS E. LEVOW, *Primary Examiner.*

E. C. BARTLETT, H. M. S. SNEED,
*Assistant Examiners.*